(12) United States Patent
Hamada

(10) Patent No.: US 9,959,611 B2
(45) Date of Patent: May 1, 2018

(54) METHOD AND APPARATUS FOR MANUFACTURING SINGLE CRYSTAL

(71) Applicant: SUMCO CORPORATION, Tokyo (JP)

(72) Inventor: Ken Hamada, Tokyo (JP)

(73) Assignee: SUMCO CORPORATION, Tokyo (JP)

( * ) Notice: Subject to any disclaimer, the term of this patent is extended or adjusted under 35 U.S.C. 154(b) by 0 days. days.

(21) Appl. No.: 15/247,032

(22) Filed: Aug. 25, 2016

(65) Prior Publication Data

US 2017/0076437 A1 Mar. 16, 2017

(30) Foreign Application Priority Data

Sep. 15, 2015 (JP) .................................. 2015-181376

(51) Int. Cl.
*G06K 9/00* (2006.01)
*G06T 7/00* (2017.01)

(52) U.S. Cl.
CPC .......... *G06T 7/0004* (2013.01); *G06T 7/0079* (2013.01); *G06T 2207/30148* (2013.01)

(58) Field of Classification Search
None
See application file for complete search history.

(56) References Cited

U.S. PATENT DOCUMENTS

| 6,583,810 | B1 * | 6/2003 | Yamamura | C30B 15/26 117/14 |
| 7,172,656 | B2 * | 2/2007 | Takanashi | C30B 15/26 117/14 |
| 8,871,023 | B2 * | 10/2014 | Takanashi | C30B 15/20 117/13 |
| 2004/0221794 | A1 * | 11/2004 | Takanashi | C30B 15/26 117/14 |
| 2016/0186359 | A1 * | 6/2016 | Takanashi | C30B 15/26 117/14 |

FOREIGN PATENT DOCUMENTS

| JP | 61-122188 | | 6/1986 | |
| JP | 5-49635 | | 7/1993 | |
| JP | 2003-12395 | | 1/2003 | |
| JP | 2009057216 | A * | 3/2009 | ............ C30B 15/26 |
| JP | 2013216556 | A * | 10/2013 | |

* cited by examiner

*Primary Examiner* — Iman K Kholdebarin
(74) *Attorney, Agent, or Firm* — Greenblum & Bernstein, P.L.C.

(57) ABSTRACT

Disclosed herein is a method for manufacturing a single crystal, the method includes: photographing an image of a boundary portion between the single crystal and a melt by a camera during a single crystal pull-up process according to a Czochralski method; comparing at least one pixel included in a left side region with respect to an extension line of a pull-up shaft of the single crystal and at least one pixel included in a right side region with respect to the extension line; and determining an abnormality in a luminance distribution of the image from a result of the comparing.

10 Claims, 6 Drawing Sheets

METHOD AND APPARATUS FOR MANUFACTURING SINGLE CRYSTAL

BACKGROUND OF THE INVENTION

Field of the Invention

The present invention relates to a method and apparatus for manufacturing a single crystal using the Czochralski method (CZ method) and, more particularly, to a method and apparatus that inspects abnormality of a luminance distribution of an image taken by a camera that photographs the inside of a chamber and corrects the abnormality.

Description of Related Art

Many silicon single crystals used as a material for silicon wafers are manufactured by the CZ method. In the CZ method, a seed crystal is dipped into a silicon melt contained in a quartz crucible and slowly pulled up while rotating the seed crystal and crucible to grow a silicon single crystal with a large diameter at a lower end of the seed crystal.

In order to improve silicon wafer yield, it is important to suppress fluctuations in the diameter of a single crystal. As a method of controlling the diameter of a single crystal constant, there is known a method that measures the diameter of a single crystal being pulled up and controls pull-up conditions based on the measuring result so as to make the diameter of the single crystal constant. For example, Japanese Patent Application Laid-Open No. 2003-12395 describes a method that photographs an image of a boundary between a single crystal and melt using a camera, measures a diameter and a center position of the single crystal from the photographed image, and controls power of a heater and operations of a pull-up apparatus based on the measurement result.

Further, Japanese Patent Application Laid-Open No. 1986-122188 describes a method that detects a single crystal, a melt surface, and a fusion ring generated between the single crystal and the melt surface by using a linear image sensor. Further, Japanese Examined Patent Application Publication No. 1993-049635 describes a method that detects a position of a fusion ring by an optical sensor and measures a diameter of a single crystal based on the detection result. More specifically, in this method, a light shielding plate is disposed between a peripheral wall of a crucible and a single crystal to be pulled up so as to eliminate optical influence from the crucible, whereby a diameter measurement error is reduced.

As described above, in the single crystal diameter measurement, the inside of a chamber is photographed by a camera, and the single crystal diameter is calculated from an image of the fusion ring generated at the boundary between the single crystal and the melt. The inside of the chamber is photographed through an observation window provided at an upper portion of the chamber.

However, an SiO gas is generated by silicon melt evaporation inside the chamber during a pull-up process of the single crystal, and a glass surface of the observation window is clouded by influence of the SiO gas, which may result in unevenness in the luminance distribution of the photographed image. In order to cope with this, an argon gas (purge gas) is introduced into the chamber, and the SiO gas generated inside the chamber is discharged outside the chamber together with the argon gas. However, the SiO gas inside the chamber cannot completely be removed, so that it is difficult to completely prevent adhesion of the SiO gas to the glass surface of the observation window. When SiO unevenly adheres to the glass surface of the observation window due to long-term continuous use of the chamber to increase unevenness in a luminance distribution in a horizontal axis direction of the photographed image, the diameter of the silicon single crystal may be erroneously measured, causing fluctuations in single crystal diameter.

SUMMARY

An object of the present invention is therefore to provide a method and apparatus for manufacturing a single crystal capable of inspecting a luminance distribution of an image taken by a camera that photographs an inside of a chamber and correcting luminance unevenness.

To solve the above problem, a method for manufacturing a single crystal according to the present invention is provided with photographing an image of a boundary portion between a single crystal and a melt by means of a camera during a single crystal pull-up process according to the Czochralski method; comparing at least one pixel included in a left side region with respect to an extension line of a pull-up shaft of the single crystal and at least one pixel included in a right side region with respect to the extension line; and determining presence/absence of abnormality in the luminance distribution of the photographed image from the comparison result.

According to the present invention, based on a fact that the image of the boundary portion between the single crystal and the melt is bilaterally symmetric, it is possible to determine presence/absence of abnormality in the luminance distribution of a photographed image from a luminance distribution symmetric property of the photographed image, whereby presence/absence of the abnormality in the luminance distribution of the photographed image can easily be inspected. Thus, a single crystal manufacturing method capable of manufacturing a single crystal with less diameter fluctuation can be provided.

In the single crystal manufacturing method according to the present invention, it is preferable that when a luminance difference between a first maximum luminance in the left side region and a second maximum luminance in the right side region is equal to or larger than a threshold, it is determined that the luminance distribution of the photographed image is determined to be abnormal. According to this method, it is possible to accurately detect presence/absence of the abnormality in the illuminance distribution of the photographed image with a very small calculation amount.

In the present invention, it is preferable that the camera photographs the image of the boundary portion through a dimming glass with an in-plane varying dimming rate and, when the luminance distribution of the photographed image is determined to be abnormal, the dimming glass is used to adjust the luminance distribution of the photographed image so that the luminance difference becomes less than the threshold. In this case, it is preferable that the dimming glass has an in-plane distribution in which the dimming rate changes in one direction and, when the luminance distribution of the photographed image is determined to be abnormal, the luminance distribution of the photographed image is adjusted by rotating the dimming glass about the optical axis of the camera so that the luminance difference becomes less than the threshold. According to this method, it is possible to reduce luminance distribution unevenness of the photographed image by taking advantage of dimming rate in-plane unevenness that the dimming glass has.

In the single crystal manufacturing method according to the present invention, it is preferable that a diameter of the single crystal in a solid-liquid interface is calculated from the photographed image when the luminance distribution of the photographed image is determined to be normal. In this case, it is preferable that the diameter of the single crystal in the solid-liquid interface is calculated from an edge pattern of a fusion ring generated in the boundary portion, the edge pattern being calculated by binarizing the photographed image. According to this method, it is possible to accurately calculate the single crystal diameter and the liquid level of the melt in the solid-liquid interface. Thus, a high-quality single crystal with less diameter fluctuation can be manufactured.

Further, an apparatus for manufacturing a single crystal according to the present invention is provided with a chamber provided with an observation window; a crucible supporting a melt in the chamber; a pull-up shaft pulling up a single crystal from the melt; a camera that photographs an image of a boundary portion between the single crystal and the melt through the observation window; and an image processing section that processes the image photographed by the camera. The image processing section determines presence/absence of abnormality in a luminance distribution of the photographed image from a result of comparison between at least one pixel included in a left side region with respect to an extension line of the pull-up shaft and at least one pixel included in a right side region with respect to the extension line.

According to the present invention, based on a fact that the image of the boundary portion between the single crystal and the melt is bilaterally symmetric, it is possible to determine presence/absence of abnormality in the luminance distribution from a luminance distribution symmetric property of the photographed image, whereby presence/absence of the abnormality in the luminance distribution of the photographed image can easily be inspected. Thus, a single crystal manufacturing apparatus capable of manufacturing a single crystal with less diameter fluctuation can be provided.

In the present invention, it is preferable that when a luminance difference between a first maximum luminance in the left side region and a second maximum luminance in the right side region is equal to or larger than a threshold, the image processing section determines that the luminance distribution of the photographed image is determined to be abnormal. With this configuration, it is possible to accurately detect presence/absence of the abnormality in the illuminance distribution of the photographed image with a very small calculation amount.

It is preferable that the single crystal manufacturing apparatus of the present invention further includes, outside the observation window, a dimming glass with an in-plane varying dimming rate, and when the luminance distribution of the photographed image is determined to be abnormal, the dimming glass is used to adjust the luminance distribution of the photographed image so that the luminance difference between the first maximum luminance and second maximum luminance becomes less than the threshold. In this case, it is preferable that the single crystal manufacturing apparatus includes a rotating mechanism rotating the diming glass and rotates the dimming glass about the optical axis of the camera to adjust the luminance distribution of the photographed image. With this configuration, it is possible to reduce luminance distribution unevenness of the photographed image by taking advantage of dimming rate in-plane unevenness that the dimming glass has.

In the present invention, it is preferable that the image processing section calculates the diameter of the single crystal in a solid-liquid interface from the photographed image when the luminance distribution of the photographed image is determined to be normal. In this case, it is preferable that the image processing section calculates the diameter of the single crystal in the solid-liquid interface from an edge pattern of a fusion ring generated in the boundary portion, the edge pattern being calculated by binarizing the photographed image. With this configuration, it is possible to accurately calculate the single crystal diameter and a liquid level of the melt in the solid-liquid interface. Thus, a high-quality single crystal with less diameter fluctuation can be manufactured.

According to the present invention, it is possible to provide a method and apparatus for manufacturing a single crystal capable of detecting and correcting the abnormality in the luminance distribution of the image photographed by the camera used for measuring the single crystal diameter and the liquid level of the melt.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Hereinafter, preferred embodiments of the present invention will be described in detail with reference to accompanying drawings.

Figure 1:
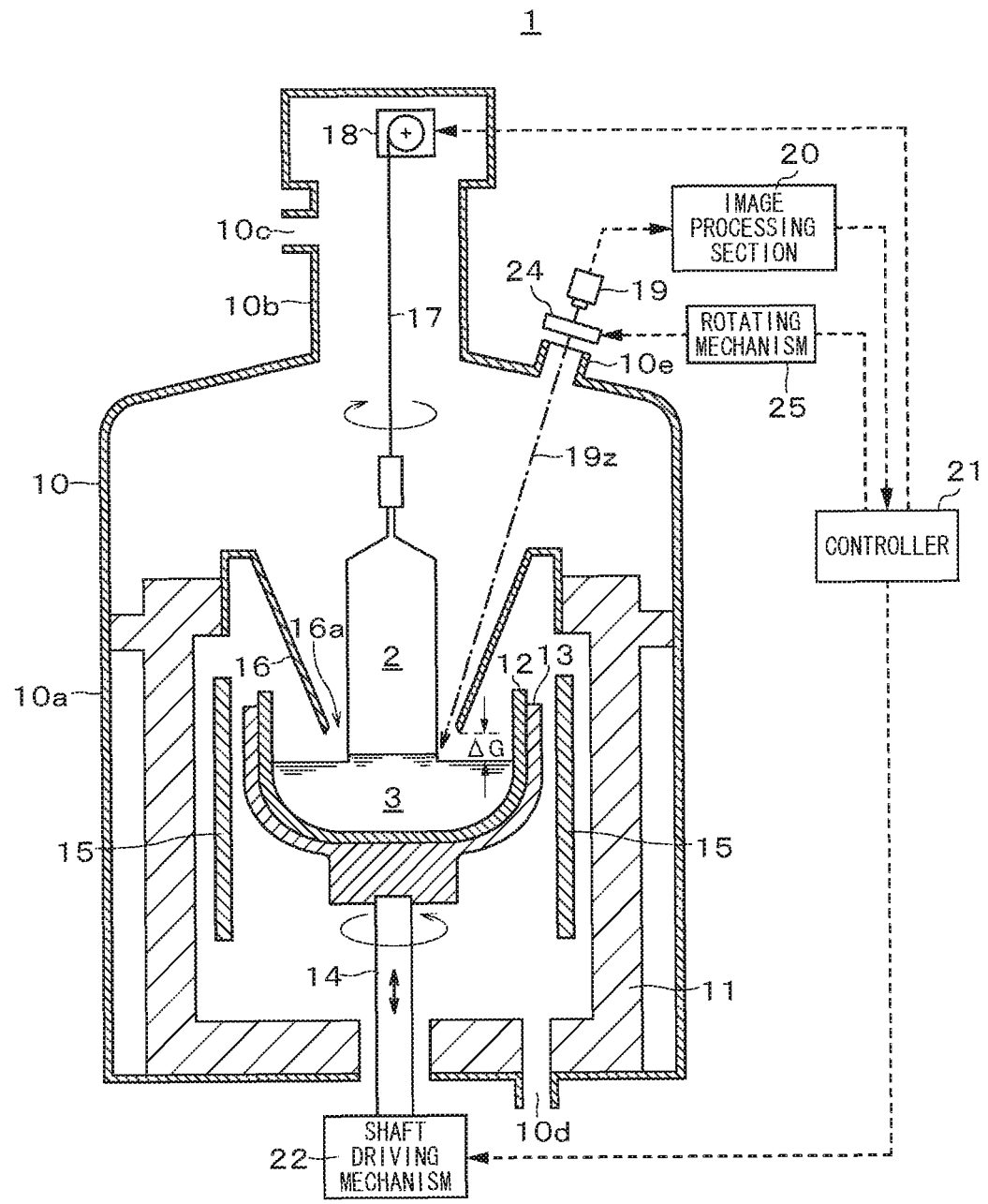
FIG. 1 is a cross-sectional side view schematically illustrating a configuration of a single crystal manufacturing apparatus according to an embodiment present invention.

FIG. 1 is a cross-sectional side view schematically illustrating a configuration of a single crystal manufacturing apparatus according to an embodiment present invention.

As illustrated in FIG. 1, a single crystal manufacturing apparatus 1 includes a chamber 10, a heat insulator 11 disposed along the inner surface of the chamber 10, a quartz crucible 12 supporting a silicon melt 3 in the chamber 10, a graphite susceptor 13 supporting the quartz crucible 12, a shaft 14 vertically movably and rotatably supporting the susceptor 13, a heater 15 disposed around the susceptor 13, a heat-shield body 16 disposed above the quartz crucible 12, a single crystal pull-up wire 17 disposed above the quartz crucible 12 so as to be coaxial with the shaft 14, a wire winding mechanism 18 disposed at an upper portion of the chamber 10, and a CCD camera 19 that photographs the inside of the chamber 10.

The chamber 10 is constituted of a main chamber 10a and an elongated cylindrical pull chamber 10b connected to an upper opening of the main chamber 10a. The quartz crucible 12, susceptor 13, heater 15, and heat-shield body 16 are provided in the main chamber 10a. The susceptor 13 is fixed to an upper end portion of the shaft 14 vertically provided penetrating a bottom center of the chamber 10. The shaft 14 is moved up/down and rotated by a shaft drive mechanism 22.

The heater 15 is used to melt a silicon raw material filled in the quartz crucible 12 to generate the silicon melt 3. The heater 15 is a resistance heating type heater made of carbon and is provided so as to surround the quartz crucible 12 in the susceptor 13.

The heat-shield body 16 is provided to prevent the single crystal 2 from being heated by heater 15 and radiation heat from the quartz crucible 12 and to suppress a temperature fluctuation of the silicon melt 3. The heat-shield body 16 is a member having an inverted truncated cone shape in which a diameter thereof is gradually reduced from an upper side to a lower side. The heat-shield body 16 is provided so as to cover the silicon melt 3 from above and to surround the single crystal 2 being grown. Preferably, the heat-shield body 16 is made of graphite. A lower end portion of the heat-shield body 16 is positioned inside the quartz crucible 12, so that when the quartz crucible 12 is moved up, it does not interfere with the heat-shield body 16. An opening 16a having a diameter larger than that of the single crystal 2 is formed at a center of the heat-shield body 16, and the single crystal 2 is pulled up through the opening 16a.

The wire 17 as a pull-up shaft of the single crystal 2 and the wire winding mechanism 18 for winding the wire 17 are provided above the quartz crucible 12. The wire winding mechanism 18 has a function of rotating the wire 17 and the single crystal 2. The wire winding mechanism 18 is provided above the pull chamber 10b. The wire 17 extends downward from the wire winding mechanism 18, passing through the pull chamber 10b, and a leading end of the wire 17 reaches an inner space of the main chamber 10a. In FIG. 1, the single crystal 2 being grown is suspended by the wire 17. At the time of pulling up the single crystal 2, a seed crystal is dipped into the silicon melt 3, and the wire 17 is gradually pulled up while rotating the quartz crucible 12 and seed crystal to grow a silicon single crystal 2.

A gas inlet 10c for introducing an argon gas into the chamber 10 is provided at an upper portion of the pull chamber 10b, and a gas outlet 10d for discharging the argon gas from the chamber 10 is provided at a bottom portion of the main chamber 10a. The argon gas is introduced into the chamber 10 through the gas inlet 10c. An amount of the argon gas to be introduced is controlled by a valve. The argon gas in the sealed chamber 10 is discharged outside the chamber 10 through the gas outlet 10d, so that it is possible to purge an SiO gas or CO gas in the chamber 10 to thereby keep the inside of the chamber 10 clean. Although not illustrated, a vacuum pump may be connected to the gas outlet 10d through a pipe, and the inside of the chamber 10 is maintained in a certain depressurized state by controlling the flow rate of the argon gas using the valve while suctioning the argon gas in the chamber 10 using the vacuum pump.

An observation window 10e for observing the inside of the chamber 10 is provided at an upper portion of the main chamber 10a, and the CCD camera 19 is installed outside the observation window 10e. The CCD camera 19 photographs an image of a boundary portion between the single crystal 2 and silicon melt 3 that can be seen through the observation window 10e and the opening 16a of the heat-shield body 16. The photographed image of the CCD camera 19 is preferably a grayscale image, but may be a color image. The CCD camera 19 is connected to an image processing section 20. The photographed image is processed in the image processing section 20, and the processing result is used for the control of pull-up conditions in a controller 21.

The image photographed by the CCD camera 19 is distorted since it is photographed from above the single crystal manufacturing apparatus 1 in an oblique direction that crosses the pull-up shaft of the single crystal 2. This distortion can be corrected using a theoretical formula or a correction table. This correction allows the image to be converted into a distortion-free image which can be obtained only when the image is photographed from a direction parallel to the pull-up shaft.

A dimming glass 24 is provided outside the observation window 10e and on an optical axis 19z of the CCD camera 19. The dimming glass 24 is an optical component that reduces a light incident amount to the CCD camera 19. As the dimming glass 24, one whose surface is deposited with gold (Au) and having high heat resistance is used. However, in the dimming glass 24 of such a type, an in-plane distribution of a dimming rate (light transmittance) cannot easily be made completely even for manufacture reason and, actually, there is unevenness in the dimming rate in-plane distribution. In most cases, an in-plane deviation of the dimming rate of the dimming glass 24 is 5% to 15% and, for example, there may be a case where a region where the dimming rate is relatively high exists in the left half of the dimming glass 24 and a region where the dimming rate is relatively low exists in the right half. Although details will be described later, in order to prevent unevenness of the dimming rate of the dimming glass 24 from adversely affecting a symmetric luminance distribution of the photographed image, a direction in which the dimming rate of the dimming glass 24 changes most significantly is generally set parallel to the vertical axis of the photographed image.

The dimming glass 24 of the present embodiment has a circular shape and is provided so as to be rotatable about the optical axis 19z of the CCD camera 19. The dimming glass 24 can be rotated manually or driven into rotation by a rotating mechanism 25. The rotating mechanism 25 rotates the dimming glass 24 according to an instruction from the controller 21. The controller 21 rotates the dimming glass 24 by a predetermined amount based on an image processing result from the image processing section 20.

In a manufacturing process of the silicon single crystal 2, a raw material such as polycrystalline silicon is filled in the quartz crucible 12, and a seed crystal is attached to a leading end of the wire 17. Then, the silicon raw material in the quartz crucible 12 is heated by the heater 15 to generate the silicon melt 3.

In a single crystal pull-up process, seed narrowing (necking) is performed by the Dash neck method in order to obtain a dislocation-free single crystal. Then, in order to obtain a single crystal with a desired diameter, a shoulder section in which a diameter thereof gradually increases is grown. When the desired diameter of the single crystal is reached, a body section with a constant diameter is grown. After the body section is grown up to a predetermined length, a tail section narrowing (growing of a tail section) is performed in order to cut the dislocation-free single crystal away from the melt 3.

During the single crystal pull-up process, in order to control the diameter of the single crystal 2 and the liquid level of the melt 3, an image of the boundary portion between the single crystal 2 and the melt 3 is photographed by the CCD camera 19, a center position of the single crystal 2 in the solid-liquid interface is calculated from the photographed image, and a diameter of the single crystal in the solid-liquid interface and a liquid level (gap ΔG) of the melt are calculated from the center position of the single crystal 2. The controller 21 controls the pull-up conditions such as a pull-up speed of the wire 17 and a power-up condition of the heater 15 so that the diameter of the single crystal 2 reaches a target diameter. Further, the controller 21 controls a vertical position of the quartz crucible 12 so that the liquid level reaches a target level (constant level).

The liquid level of the melt has two meanings. One is a liquid level with respect to the quartz crucible 12. The liquid level with respect to the quartz crucible 12 gradually lowers mainly with the consumption of the melt associated with the growing of the single crystal 2 and may change with a change in the volume of the quartz crucible 12 due to deformation thereof. The other one is a liquid level with respect to a fixed structure in the chamber 10, such as the heater 15 or heat-shield body 16. The liquid surface level with respect to the fixed structure changes with the vertical movement of the quartz crucible 12 in the chamber 10, in addition to with the change in the liquid level with respect to the quartz crucible 12. In the present specification, the term "liquid level" denotes the liquid surface level with respect to the fixed structure unless otherwise specified.

The CCD camera 19 photographs the boundary portion between the single crystal 2 and the melt 3 from obliquely upward and thus, it cannot photograph the entire fusion ring generated in the boundary portion. Therefore, it is necessary to specify the center position of the single crystal 2 from a part of the fusion ring and then calculate the diameter of the single crystal 2 and the liquid level of the melt 3 based on the specified center position.

Figure 2:
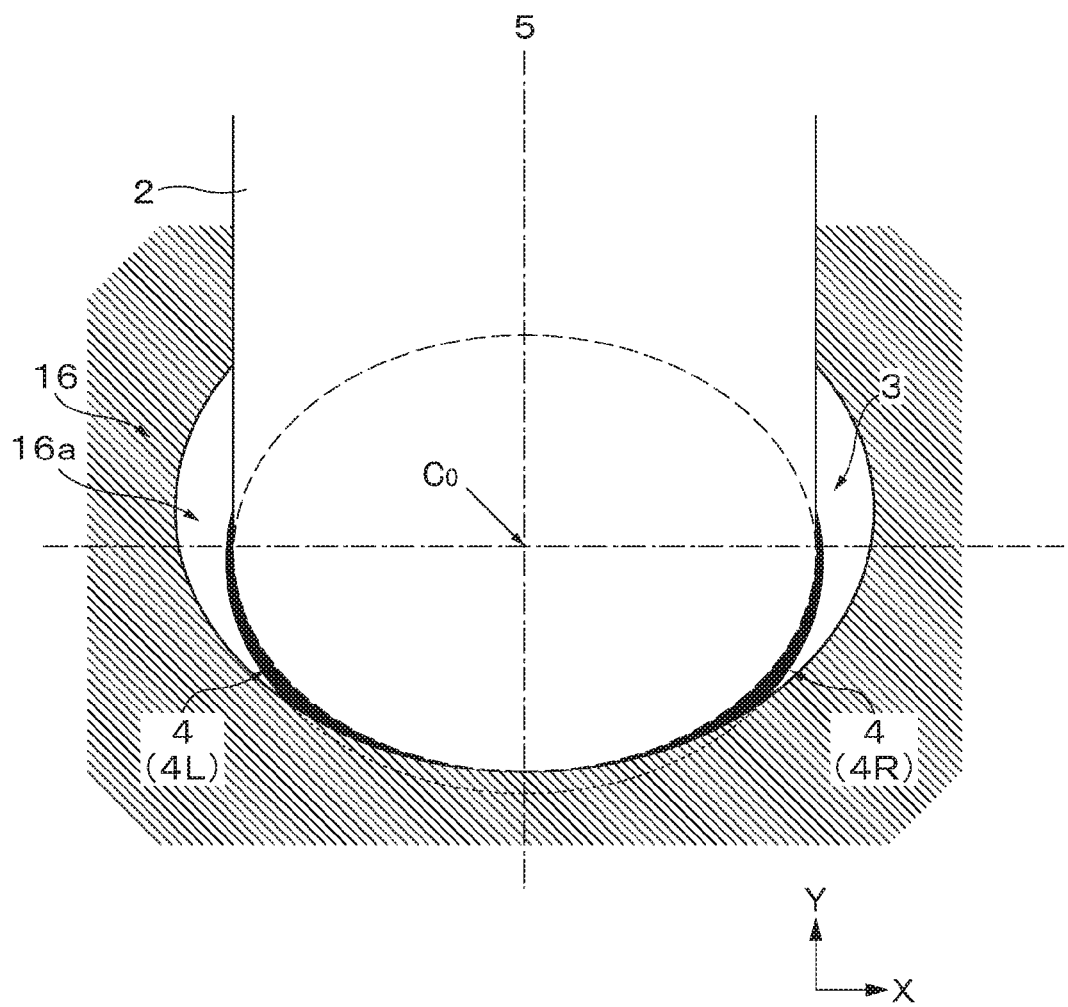
FIG. 2 is a perspective view schematically illustrating an image of the boundary portion between the single crystal and the melt that is photographed by the CCD camera.

FIG. 2 is a perspective view schematically illustrating an image of the boundary portion between the single crystal 2 and the melt 3 that is photographed by the CCD camera 19.

As illustrated in FIG. 2, the image processing section 20 calculates a center position of a fusion ring 4 generated in the boundary portion between the single crystal 2 and the melt 3, that is, calculates a center $C_0$ of the single crystal 2 in the solid-liquid interface. Based on the center $C_0$ position, the diameter of the single crystal 2 in the solid-liquid interface and the liquid level of the melt 3 are calculated. The center $C_0$ position of the single crystal 2 is an intersection between an extension line 5 of the pull-up shaft of the single crystal 2 and the melt surface. When the CCD camera 19 and the heat-shield body 16 are accurately installed at designed positions at a designed angle, it is possible to calculate geometric-optically the center $C_0$ position of the single crystal 2 from the position of the fusion ring 4 in the photographed image and then to calculate the diameter of the single crystal 2 and the liquid level.

The fusion ring 4 is a ring-shaped high luminance region formed by light reflected by a meniscus. The meniscus is a bent surface of the melt 3 formed in the boundary portion with the single crystal 2 by surface tension. The fusion ring 4 is generated in the entire periphery of the single crystal 2; however, when we view the fusion ring 4 in one direction, we cannot visually confirm the fusion ring 4 existing on the back side of the single crystal 2. Further, when we view the fusion ring 4 through a gap between the opening 16a of the heat-shield body 16 and the single crystal 2, if the single crystal 2 has a large diameter, a part of the fusion ring 4 that is located at the nearest side (lower side in the drawing) in the viewing direction is hidden on the back side of the heat-shield body 16. Therefore, we can visually confirm only a near left part 4L and a near right part 4R in the viewing direction. The present embodiment can calculate the diameter of the single crystal 2 and the liquid level of the melt 3 even when only a part of the fusion ring 4 can be observed.

Figure 3:
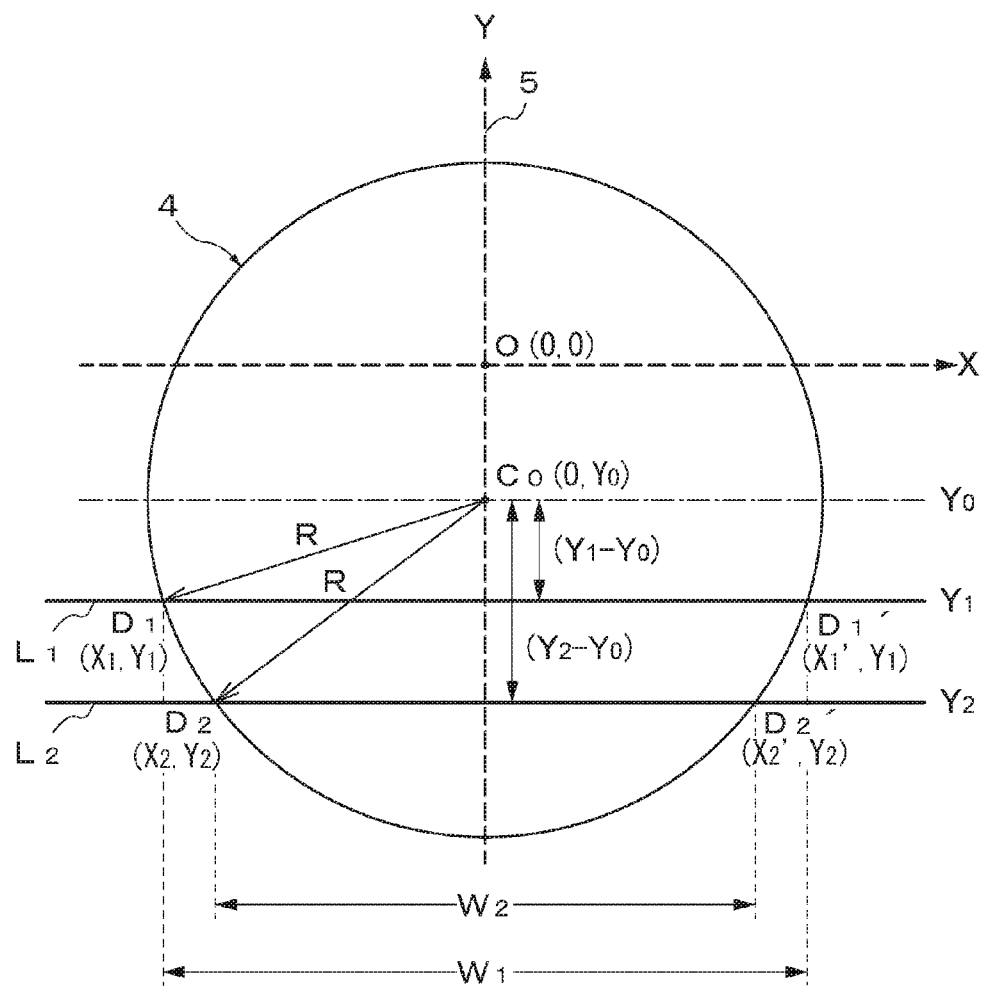
FIG. 3 is a schematic view for explaining a method of calculating the center position of the single crystal from the position of the fusion ring.

FIG. 3 is a schematic view for explaining a method of calculating the center $C_0$ position of the single crystal from the position of the fusion ring 4.

As illustrated in FIG. 3, in the calculation of the center $C_0$ position of the single crystal, two measurement lines $L_1$ and $L_2$ are set in a two-dimensional image photographed by the CCD camera 19. The two measurement lines $L_1$ and $L_2$ are each a straight line that crosses twice the fusion ring 4 and extends perpendicular to the extension line 5 of the pull-up shaft passing the center $C_0$ of the single crystal. A Y-axis (vertical axis) of the photographed image coincides with the extension line 5 of the pull-up shaft, and an X-axis (horizontal axis) extends in a direction perpendicular to the extension line 5 of the pull-up shaft. The fusion ring 4 illustrated in FIG. 3 is assumed to have an ideal shape coinciding with the outer periphery of the single crystal.

The measurement line $L_1$ (first measurement line) is set on the outer peripheral side of the single crystal relative to the center $C_0$ of the single crystal and on a lower side of the photographed image. The measurement line $L_2$ (second measurement line) is set on the further outer peripheral side (further lower side of the photographed image) of the single crystal relative to the measurement line $L_1$. Assuming that coordinates of the center $C_0$ of the single crystal with respect to the origin O (0, 0) of an XY coordinate system of the photographed image is (0, $Y_0$), a distance (first distance) from the center $C_0$ to measurement line $L_1$ is ($Y_1-Y_0$), and a distance (second distance) from the center $C_0$ to measurement line $L_2$ is ($Y_2-Y_0$).

The measurement line $L_1$ is set closer to the single crystal center than the measurement line $L_2$ is; however, when the measurement line $L_1$ is too close to the center $C_0$, the fusion ring 4 is behind the single crystal when the diameter of the single crystal is reduced, resulting in failing to detect the center $C_0$ position. Therefore, the measurement line $L_1$ is preferably set at a position separated to some degree from the center $C_0$. At the initial setting of the measurement lines $L_1$ and $L_2$, the center $C_0$ position of the single crystal is not determined, so that a landed position of the seed crystal with respect to the melt is set to a temporary center position of the single crystal.

Subsequently, two intersections $D_1$ and $D_1'$ between the measurement line $L_1$ and the fusion ring 4 and two intersections $D_2$ and $D_2'$ between the measurement line $L_2$ and the fusion ring 4 are detected. Coordinates of one intersection $D_1$ between the fusion ring 4 and the first measurement line $L_1$ is set to ($X_1$, $Y_1$), and coordinates of the other intersection $D_1'$ is set to ($X_1'$, $Y_1$). Further, coordinates of one intersection $D_2$ between the fusion ring 4 and the second measurement line $L_2$ is set to ($X_2$, $Y_2$), and coordinates of the other intersection $D_2'$ is set to ($X_2'$, $Y_2$).

Assuming that a distance (first distance) between the two intersections $D_1$ and $D_1'$ on the measurement line $L_1$ is set to $W_1=X_1'-X_1$, that a distance (second distance) between the two intersections $D_2$ and $D_2'$ on the measurement line $L_2$ is set to $W_2=X_2'-X_2$, and that a radius of the fusion ring 4 is set to R, the following equations (1) and (2) are obtained.

$$(R/2)^2=(W_1/2)^2+(Y_1-Y_0)^2 \qquad (1)$$

$$(R/2)^2=(W_2/2)^2+(Y_2-Y_0)^2 \qquad (2)$$

From the equations (1) and (2), the Y-coordinate $Y_0$ of the center $C_0$ of the single crystal can be calculated according to the following equation (3).

$$Y_0=\{(W_1^2-W_2^2)/4(Y_1-Y_2)+(Y_1+Y_2)\}/2 \qquad (3)$$

Thus, the coordinates $(0, Y_O)$ of the center $C_O$ position of the single crystal 2 in the photographed image can be calculated. By using the thus obtained center $C_O$ position of the single crystal 2, the diameter R of the single crystal and the liquid level of the melt 3 can be calculated.

In the detection of the intersections between the fusion ring 4 and the measurement lines L1, L2, a threshold of luminance for the fusion ring 4 is used to binarize the photographed image, an edge pattern of the fusion ring 4 is detected from the resultant image, and intersections between the edge pattern and the measurement lines are obtained as the intersections between the fusion ring 4 and the measurement lines L1, L2. The fusion ring is a band-like high luminance region having a certain width, so that in order to accurately calculate the intersections, it is necessary to convert the image of the fusion ring 4 into a line pattern.

The threshold of luminance for the fusion ring 4 is a value obtained by multiplying the maximum luminance in the photographed image by a predetermined coefficient (e.g., 0.8). The coefficient needs to be set to an appropriate value that can correctly specify the fusion ring and may be changed in a range of 0.6 to 0.95 according to the pull-up conditions. In selecting the maximum luminance in the photographed image, one pixel that has the maximum luminance by itself may be selected, or in order to reduce the effect of noise, a plurality of consecutive pixels that have the maximum luminance or a luminance value close to the maximum luminance may be selected.

As described above, the luminance distribution of the photographed image becomes bilaterally symmetric with respect to the extension line 5 of the pull-up shaft. However, when SiO evaporated from the melt 3 during the pull-up process adheres to the glass surface of the observation window 10e, and the light transmittance in-plane distribution of the observation window 10e becomes uneven due to an increase in the SiO adhering amount, the luminance distribution of the image photographed through the observation window 10e becomes uneven. Such luminance unevenness may cause a calculation error of the crystal diameter. For example, 20% luminance unevenness in the growing of a single crystal for 300 mm wafer may cause a diameter calculation error of about 2.0 mm. In the present embodiment, the following method is used to eliminate the influence of the luminance unevenness.

Figure 4:
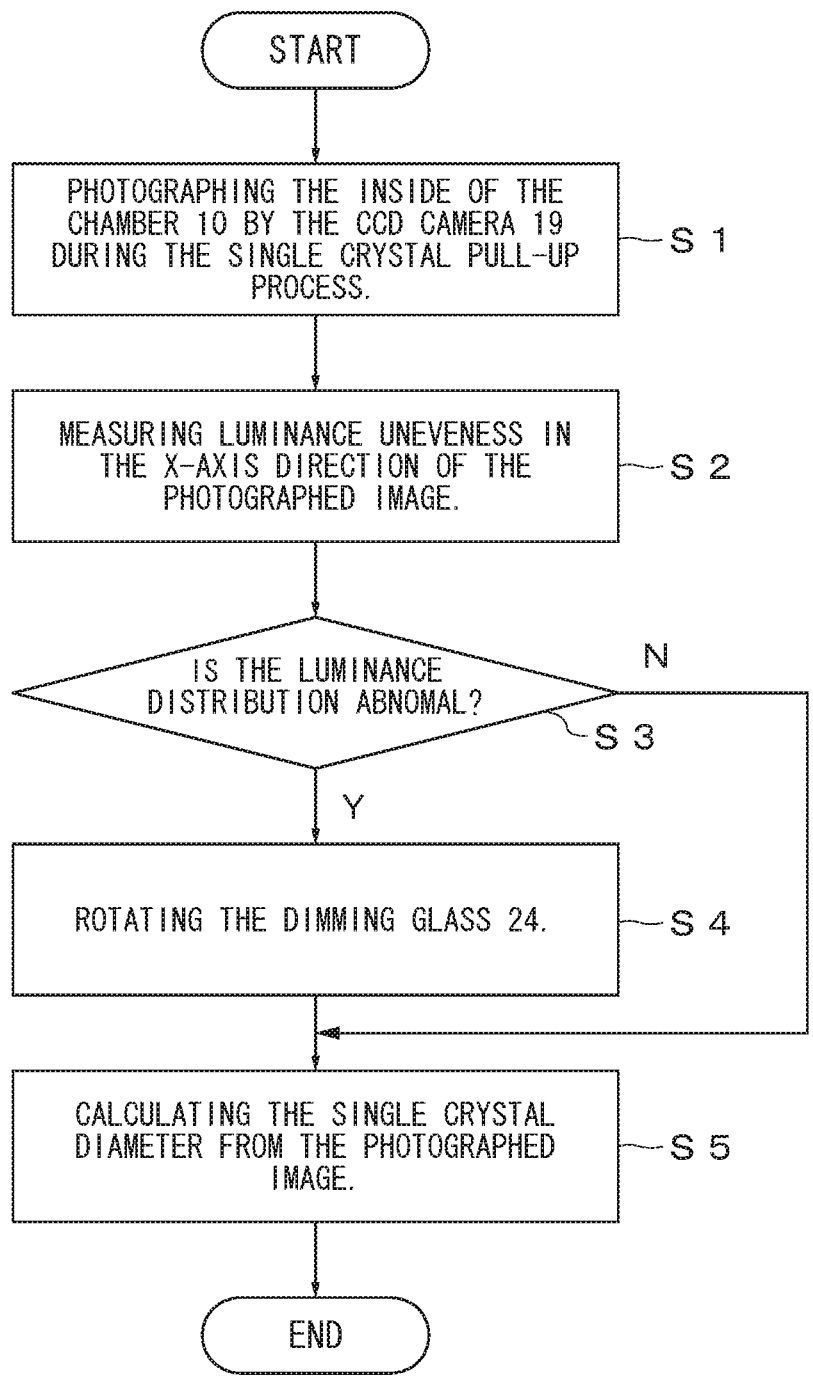
FIG. 4 is a flowchart for explaining an inspection and correction method for the illumination distribution of the photographed image.
Figure 5:
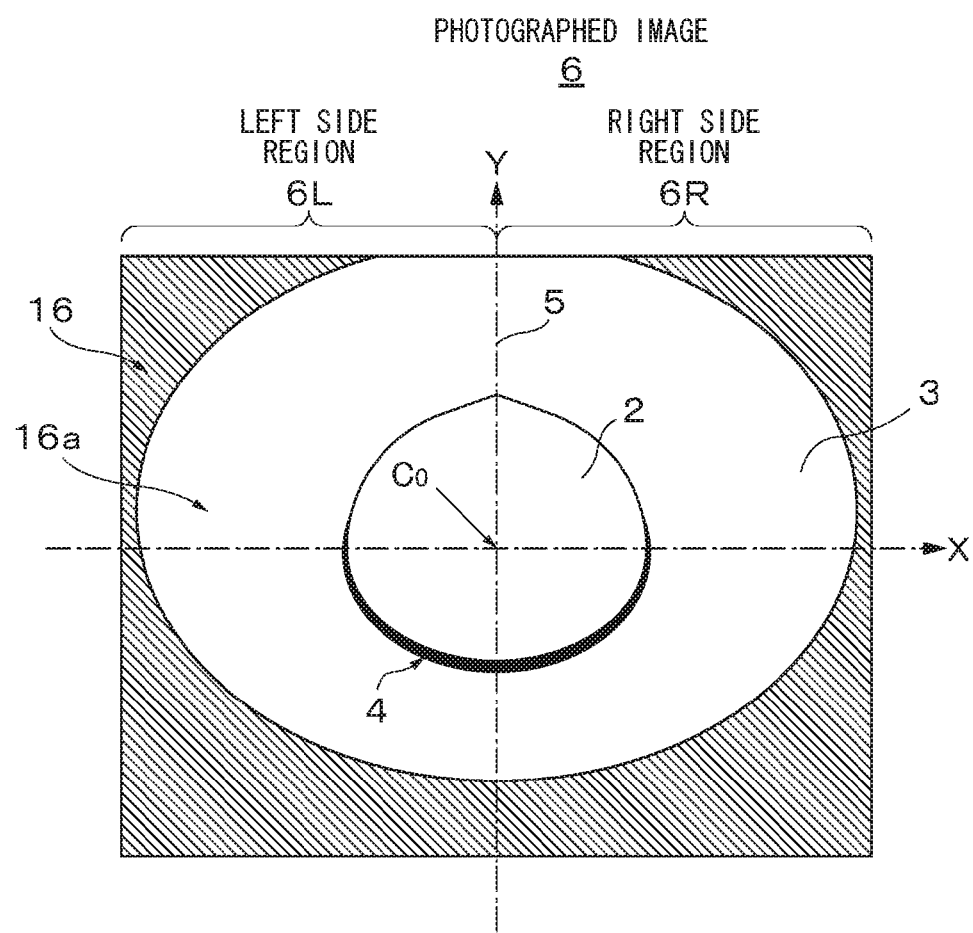
FIG. 5 is a schematic view for explaining a measurement method for X-axis direction luminance unevenness of the photographed image.

FIG. 4 is a flowchart for explaining an inspection and correction method for the illumination distribution of the photographed image. FIG. 5 is a schematic view for explaining a measurement method for X-axis direction luminance unevenness of the photographed image.

As illustrated in FIG. 4, in the inspection of the luminance distribution of the photographed image, first the CCD camera 19 is used to photograph the inside of the chamber 10 during the single crystal pull-up process (step S1). During the single crystal pull-up process, the boundary portion between the single crystal 2 and the melt 3 is photographed on a constant basis, so that the obtained photographed images may be used for the luminance distribution inspection.

The luminance distribution inspection for the photographed image may be made to some or all the images photographed during the single crystal pull-up process. A processing load of the illuminance distribution inspection is small, so that the inspection can be easily made to all the images.

The initial luminance distribution inspection preferably needs to be performed before a body section growing process. By eliminating a cause of the diameter measurement error before the start of the body section growing process, accuracy of body section diameter control can be enhanced. When the initial luminance distribution inspection is performed during a seed narrowing process, the diameter control accuracy can be enhanced at the earliest stage of the pull-up process. When the initial luminance distribution inspection is performed during a shoulder section growing process, the luminance unevenness can be easily detected since the diameter of the fusion ring 4 become large to some degree.

Subsequently, the X-axis direction luminance unevenness of the photographed image is measured (step S2). As illustrated in FIG. 5, in the luminance unevenness measurement, the maximum luminance (first maximum luminance) in a region 6L on the left side with respect to the Y-axis in the photographed image 6, i.e., the extension line 5 of the pull-up shaft of the single crystal 2 and the maximum luminance (second maximum luminance) in a region 6R on the right side with respect to the extension line 5 are compared to each other. When a difference (luminance difference) between the two maximum luminance values is equal to or larger than a threshold, it is determined that the luminance distribution of the photographed image 6 is abnormal (YES in step S3).

For example, 5% of the maximum luminance (one of the first and second maximum luminance) in the photographed image 6 is set as the threshold. When the luminance difference is equal to or larger than 5%, it means that the X-axis direction luminance unevenness of the photographed image is large and that the luminance distribution becomes bilaterally asymmetric, so it is determined that the luminance distribution is abnormal. On the other hand, when the luminance difference is less than 5%, it means that the luminance unevenness falls within an allowable range, so it is determined that the luminance distribution is normal. When the luminance distribution of the photographed image is normal (NO in step S3), the pull-up process is continued as it is.

On the other hand, when the luminance distribution of the photographed image is abnormal, the dimming glass 24 is rotated about the optical axis 19z of the CCD camera 19 to adjust the orientation of the dimming glass 24 so that the luminance difference becomes less than the threshold (step S4). The controller 21 sends a control signal to the rotating mechanism 25 according to the processing result from the image processing section 20 to thereby automatically adjust orientation of the dimming glass 24. Changing the orientation of the dimming glass 24 allows the light transmittance unevenness of the observation window 10e and the dimming rate (light transmittance) unevenness of the dimming glass 24 to cancel each other, making it possible to reduce the X-axis direction luminance unevenness of the photographed image.

Figure 6A:
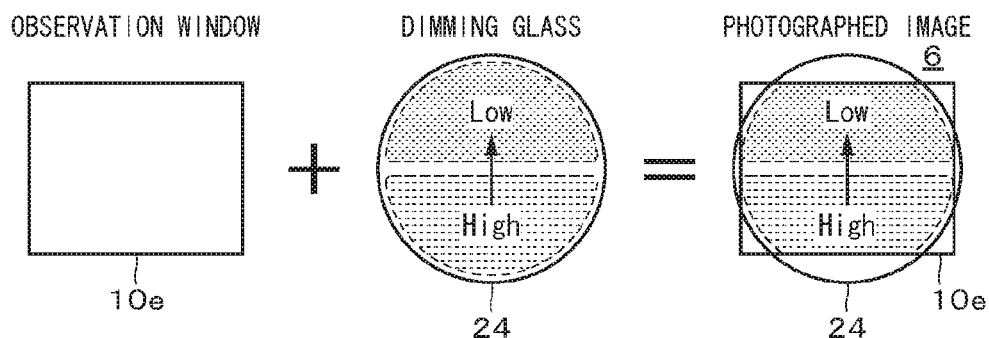
FIGS. 6A to 6C are schematic views for explaining a luminance unevenness correction method for the photographed image.
Figure 6B:
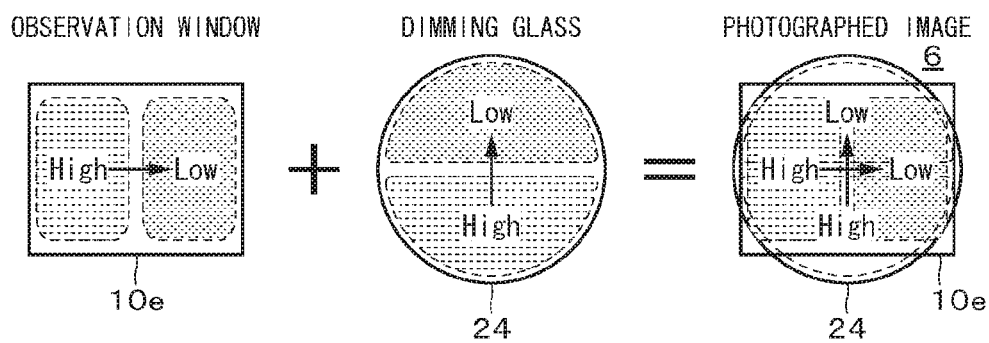
Figure 6C:
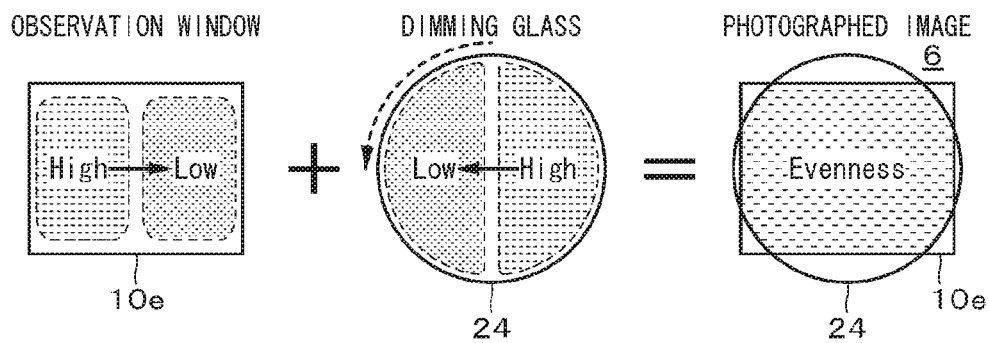

FIGS. 6A to 6C are schematic views for explaining a luminance unevenness correction method for the photographed image.

As illustrated in FIG. 6A, there is no adhesion of SiO to the glass surface of the observation window 10e at the start of use of a new chamber 10 or immediately after cleaning, and there is no unevenness of the light transmittance. Therefore, the luminance unevenness due to the presence of the observation window 10e does not occur in the photographed image 6. In this case, the luminance unevenness of the photographed image 6 may occur due to the light transmittance unevenness of the dimming glass 24, so that the influence of the light transmittance unevenness of the dimming glass 24 is eliminated from the photographed image 6. In general, the dimming glass 24 is oriented such that a direction (see an arrow in the drawing) in which the light transmittance changes most greatly is parallel to the vertical axis of the photographed image.

The orientation of the dimming glass 24 can be set by checking the X-axis direction luminance of the photographed image 6 while rotating the dimming glass 24 once and finding the orientation of the dimming glass 24 in which the luminance unevenness of the photographed image is minimum. That is, the operator fumbles for a favorable orientation of the dimming glass 24, and sets the orientation in which a best result can be obtained. As a result, the influence of the light transmittance unevenness of the dimming glass 24 can be eliminated. When the direction of the dimming rate unevenness of the dimming glass 24 is set in the Y-axis direction, the X-axis direction luminance unevenness of the photographed image 6 does not occur, making it possible to reduce the diameter measurement error.

As illustrated in FIG. 6B, when the adhering amount of SiO to the glass surface of the observation window 10e is increased after repeated single crystal pull-up processes, the light transmittance of the glass surface of the observation window 10e gradually decreases, causing unevenness in the in-plane distribution of the light transmittance. A rightward arrow in the observation window 10e denotes a direction in which the light transmittance decreases and indicates that the light transmittance decreases from the left to right. When such light transmittance unevenness occurs in the glass surface of the observation window 10e, the luminance unevenness also occurs in the X-axis direction of the photographed image.

In order to reduce the luminance unevenness of the photographed image 6 due to the condition of the observation window 10e, the orientation of the dimming glass 24 is adjusted as illustrated in FIG. 6C. In this example, the dimming glass 24 is rotated by 90 degrees in the counterclockwise direction, whereby the light transmittance unevenness of the observation window 10e and the light transmittance unevenness of the dimming glass 24 cancel each other, with the result that the luminance distribution of the photographed image 6 becomes even. In the adjustment of the orientation of the dimming glass 24, the above-described method that finds the minimum value of the X-direction luminance unevenness of the photographed image 6 while rotating the dimming glass 24 once may be employed, or how much the dimming glass 24 is to be rotated is previously known, it may be rotated at a predetermined angle.

When the abnormality has been corrected successfully, or when the illuminance distribution of the photographed image 6 is originally normal, the single crystal diameter is calculated from the photographed image (step S5). In this case, the center position of the single crystal 2 in the solid-liquid interface can be calculated from the fusion ring 4 generated in the boundary portion between the single crystal 2 and the melt 3, and the diameter of the single crystal 2 in the solid-liquid interface can be calculated using coordinates of the center position and those of arbitrary points (intersections between the fusion ring and the measurement lines) on the fusion ring. Further, the liquid level of the melt can be calculated from the center position of the single crystal 2 in the photographed image.

As described above, in the silicon single crystal manufacturing method according to the present embodiment, the fusion ring is photographed through the chamber observation window 10e, and the maximum luminance in the region on the left side with respect to the Y-axis in the photographed image 6 coinciding with the extension line 5 of the pull-up shaft of the single crystal 2 and the maximum luminance in the region on the right side with respect to the extension line 5 are compared to each other. Then, when a difference between the two maximum luminance values is equal to or larger than a threshold, it is determined that the luminance distribution is abnormal. Thus, it is possible to easily detect luminance unevenness of the observation window 10e due to cloudiness of the glass surface with a small calculation amount. Further, in the present embodiment, the in-plane unevenness of the dimming rate of the dimming glass 24 is used to adjust the orientation of the dimming glass 24 so that the luminance difference falls within the threshold when the luminance distribution of the photographed image 6 is abnormal. Thus, the luminance unevenness of the photographed image 6 can be corrected, and diameter measurement accuracy of the single crystal 2 can be enhanced.

It is apparent that the present invention is not limited to the above embodiments, but may be modified and changed without departing from the scope and spirit of the invention.

For example, in the above embodiment, one pixel having the maximum luminance in the region 6L on the left side with respect to the extension line 5 of the pull-up shaft of the single crystal 2 and one pixel having the maximum luminance in the region 6R on the right side with respect to the extension line 5 are compared to each other, and presence/absence of the abnormality is determined from the comparison result; however, the present invention is not limited to this method, but presence/absence of the abnormality of luminance distribution of the photographed image 6 may be determined from a result of comparison between at least one pixel included in the left side region 6L with respect to the extension line 5 of the pull-up shaft and at least one pixel included in the right side region 6R with respect to the extension line 5.

Further, in the above embodiment, the dimming glass is rotated so that the luminance difference becomes less than the threshold to thereby adjust the luminance distribution of the photographed image; however, the dimming glass may be slid in one direction so as to adjust the luminance distribution.

Further, although the present invention is applied to the manufacturing of the silicon single crystal in the above embodiment, it may also be applied to the manufacturing of single crystals other than the silicon single crystal.

What is claimed is:

1. A method for manufacturing a single crystal comprising:
   photographing an image of a boundary portion between the single crystal and a melt by a camera during a single crystal pull-up process according to a Czochralski method;
   comparing at least one pixel included in a left side region with respect to an extension line of a pull-up shaft of the single crystal and at least one pixel included in a right side region with respect to the extension line; and
   determining an abnormality in a luminance distribution of the image from a result of the comparing,
   wherein the luminance distribution of the image is determined to be abnormal when a luminance difference between a first maximum luminance in the left side region and a second maximum luminance in the right side region is equal to or larger than a threshold.

2. The method as claimed in claim 1, wherein
   the camera photographs the image of the boundary portion through a dimming glass with an in-plane varying dimming rate, and the dimming glass is used to adjust the luminance distribution of the image so that the luminance difference becomes less than the threshold when the luminance distribution of the image is determined to be abnormal.

3. The method as claimed in claim 2, wherein
the dimming glass has an in-plane distribution in which the dimming rate changes in one direction, and
the luminance distribution of the image is adjusted by rotating the dimming glass about an optical axis of the camera so that the luminance difference becomes less than the threshold when the luminance distribution of the image is determined to be abnormal.

4. The method as claimed in claim 1, wherein a diameter of the single crystal in a solid-liquid interface is calculated from the image when the luminance distribution of the image is determined to be normal.

5. The method as claimed in claim 1, wherein the diameter of the single crystal in a solid-liquid interface is calculated from an edge pattern of a fusion ring generated in the boundary portion, the edge pattern being calculated by binarizing the image.

6. An apparatus for manufacturing a single crystal comprising:
a chamber provided with an observation window;
a crucible supporting a melt in the chamber;
a pull-up shaft pulling up the single crystal from the melt;
a camera that photographs an image of a boundary portion between the single crystal and the melt through the observation window; and
an image processing section that processes the image photographed by the camera,
wherein the image processing section determines an abnormality in a luminance distribution of the image from a result of comparison between at least one pixel included in a left side region with respect to an extension line of the pull-up shaft and at least one pixel included in a right side region with respect to the extension line, and
wherein the image processing section determines that the luminance distribution of the image is determined to be abnormal when a luminance difference between a first maximum luminance in the left side region and a second maximum luminance in the right side region is equal to or larger than a threshold.

7. The apparatus as claimed in claim 6, further comprising a dimming glass with an in-plane varying dimming rate provided outside the observation window,
wherein the dimming glass is used to adjust the luminance distribution of the image so that the luminance difference between the first maximum luminance and the second maximum luminance becomes less than the threshold when the luminance distribution of the image is determined to be abnormal.

8. The apparatus as claimed in claim 7, further comprising a rotating mechanism rotating the diming glass,
wherein the luminance distribution of the image is adjusted by rotating the dimming glass about an optical axis of the camera.

9. The apparatus as claimed in claim 6, wherein the image processing section calculates a diameter of the single crystal in a solid-liquid interface from the image when the luminance distribution of the image is determined to be normal.

10. The apparatus as claimed in claim 6, wherein the image processing section calculates the diameter of the single crystal in the solid-liquid interface from an edge pattern of a fusion ring generated in the boundary portion, the edge pattern being calculated by binarizing the image.

* * * * *